(12) United States Patent
Fowser et al.

(10) Patent No.: US 7,988,447 B2
(45) Date of Patent: Aug. 2, 2011

(54) FORMED SHEET HEAT EXCHANGER

(75) Inventors: Scott W. Fowser, Chatsworth, CA (US); Mark D. Horn, Granada Hills, CA (US); Andreas C. Straub, Costa Mesa, CA (US); Jon C. Wagner, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 534 days.

(21) Appl. No.: 11/926,555

(22) Filed: Oct. 29, 2007

(65) Prior Publication Data

US 2008/0047700 A1    Feb. 28, 2008

Related U.S. Application Data

(62) Division of application No. 10/790,377, filed on Mar. 1, 2004, now abandoned.

(51) Int. Cl.
*F28C 3/00* (2006.01)
*F28C 3/02* (2006.01)
*F28D 9/00* (2006.01)
*F28F 3/00* (2006.01)

(52) U.S. Cl. .......... 431/217; 431/11; 431/207; 431/210; 431/213; 431/215; 60/723; 60/777; 126/116 R; 165/166

(58) Field of Classification Search .............. 431/11, 431/207, 210, 213, 215, 232, 243; 126/116 R; 165/4, 164–167; 60/723, 736, 777

See application file for complete search history.

(56) References Cited

U.S. PATENT DOCUMENTS

| 2,812,165 | A |   | 11/1957 | Hammond |
| 3,111,982 | A |   | 11/1963 | Ulbricht |
| 3,113,565 | A | * | 12/1963 | Blumenshine et al. ..... 126/91 R |
| 3,274,990 | A | * | 9/1966 | MacCracken ............. 126/110 R |
| 3,294,082 | A | * | 12/1966 | Norris ........................ 126/116 R |
| 3,314,610 | A | * | 4/1967 | Reznor ........................ 431/286 |
| 3,324,845 | A | * | 6/1967 | White ........................ 126/116 R |
| 3,741,286 | A | * | 6/1973 | Muhlrad ........................... 165/4 |
| 3,941,185 | A | * | 3/1976 | Henning ........................... 165/4 |
| 3,982,981 | A |   | 9/1976 | Takao et al. |
| 4,101,287 | A |   | 7/1978 | Sweed et al. |
| 4,288,346 | A |   | 9/1981 | Hunter et al. |
| 4,298,059 | A | * | 11/1981 | Krauth et al. ................. 165/166 |
| 4,361,184 | A | * | 11/1982 | Bengtsson ................... 165/165 |
| 4,369,029 | A | * | 1/1983 | Forster et al. ................... 432/29 |

(Continued)

FOREIGN PATENT DOCUMENTS

EP        0 885 653 A2    6/1997

(Continued)

*Primary Examiner* — Steven B McAllister
*Assistant Examiner* — Daniel E Namay
(74) *Attorney, Agent, or Firm* — Alston & Bird LLP

(57) ABSTRACT

A formed sheet heat exchanger is provided for exchanging heat between fluids is provided. The apparatus includes flow divider sheets that are positioned in a stacked configuration and extend in a longitudinal direction so that adjacent pairs of the sheets define flow passages therebetween for receiving first and second fluids. Each of the sheets is nonuniform in the longitudinal direction, having a manifold portion and a corrugated portion. The corrugated portions of each adjacent pair of sheets define a plurality of fluid channels therebetween that are connected to the portion of the flow passage defined between the manifold portions. The fluid channels are configured to receive the first or second fluids and transfer thermal energy therebetween through the flow divider sheets.

14 Claims, 6 Drawing Sheets

U.S. PATENT DOCUMENTS

| | | | | |
|---|---|---|---|---|
| 4,537,178 A | * | 8/1985 | Hwang et al. | 126/110 R |
| 4,928,605 A | * | 5/1990 | Suwa et al. | 110/261 |
| 5,178,210 A | * | 1/1993 | Guillet et al. | 165/111 |
| 5,230,719 A | * | 7/1993 | Berner et al. | 96/144 |
| 5,233,755 A | | 8/1993 | Vandendriessche | |
| 5,333,598 A | * | 8/1994 | Mielke et al. | 126/116 R |
| 5,416,057 A | | 5/1995 | Lipp et al. | |
| 5,518,697 A | | 5/1996 | Dalla Betta et al. | |
| 5,577,906 A | * | 11/1996 | Hanakata et al. | 431/268 |
| 5,660,778 A | | 8/1997 | Ketcham et al. | |
| 5,816,315 A | * | 10/1998 | Stark | 165/66 |
| 5,851,636 A | * | 12/1998 | Lang et al. | 428/167 |
| 5,888,613 A | | 3/1999 | Ketcham et al. | |
| 5,927,339 A | * | 7/1999 | Ellis et al. | 138/39 |
| 6,117,578 A | | 9/2000 | Lesieur | |
| 6,159,358 A | | 12/2000 | Mulvaney, III et al. | |
| 6,174,159 B1 | * | 1/2001 | Smith et al. | 431/7 |
| 6,205,768 B1 | | 3/2001 | Dibble et al. | |
| 6,289,667 B1 | | 9/2001 | Kolaczkowski et al. | |
| 6,289,977 B1 | | 9/2001 | Claudel et al. | |
| 6,488,076 B1 | * | 12/2002 | Yasuda et al. | 165/4 |
| 6,588,213 B2 | | 7/2003 | Newburry | |
| 6,935,416 B1 | | 8/2005 | Tsunoda et al. | |
| 7,045,114 B2 | * | 5/2006 | Tonkovich et al. | 423/659 |
| 7,117,674 B2 | * | 10/2006 | Sprouse et al. | 60/723 |
| 7,117,676 B2 | * | 10/2006 | Farhangi et al. | 60/736 |
| 7,195,060 B2 | * | 3/2007 | Martin et al. | 165/157 |
| 7,251,926 B2 | * | 8/2007 | Shibata et al. | 60/39.511 |
| 7,497,247 B2 | * | 3/2009 | Haglid | 165/54 |
| 2003/0178189 A1 | * | 9/2003 | Yoshida et al. | 165/166 |
| 2003/0192318 A1 | * | 10/2003 | Sprouse et al. | 60/777 |
| 2003/0192319 A1 | * | 10/2003 | Sprouse et al. | 60/777 |
| 2004/0003598 A1 | * | 1/2004 | Farhangi | 60/777 |
| 2006/0048926 A1 | * | 3/2006 | Richter | 165/165 |
| 2006/0096297 A1 | * | 5/2006 | Griffin et al. | 60/777 |
| 2008/0135221 A1 | * | 6/2008 | Nakamura | 165/165 |
| 2008/0210411 A1 | * | 9/2008 | Rehberg | 165/164 |
| 2009/0250201 A1 | * | 10/2009 | Grippe et al. | 165/164 |
| 2010/0051250 A1 | * | 3/2010 | Taniguchi et al. | 165/166 |
| 2010/0071887 A1 | * | 3/2010 | Sugiyama et al. | 165/166 |

FOREIGN PATENT DOCUMENTS

| | | | |
|---|---|---|---|
| GB | 2033570 A | * | 5/1980 |
| JP | 57049793 A | * | 3/1982 |
| JP | 57082689 A | * | 5/1982 |
| JP | 2000018511 A | | 1/2000 |

* cited by examiner

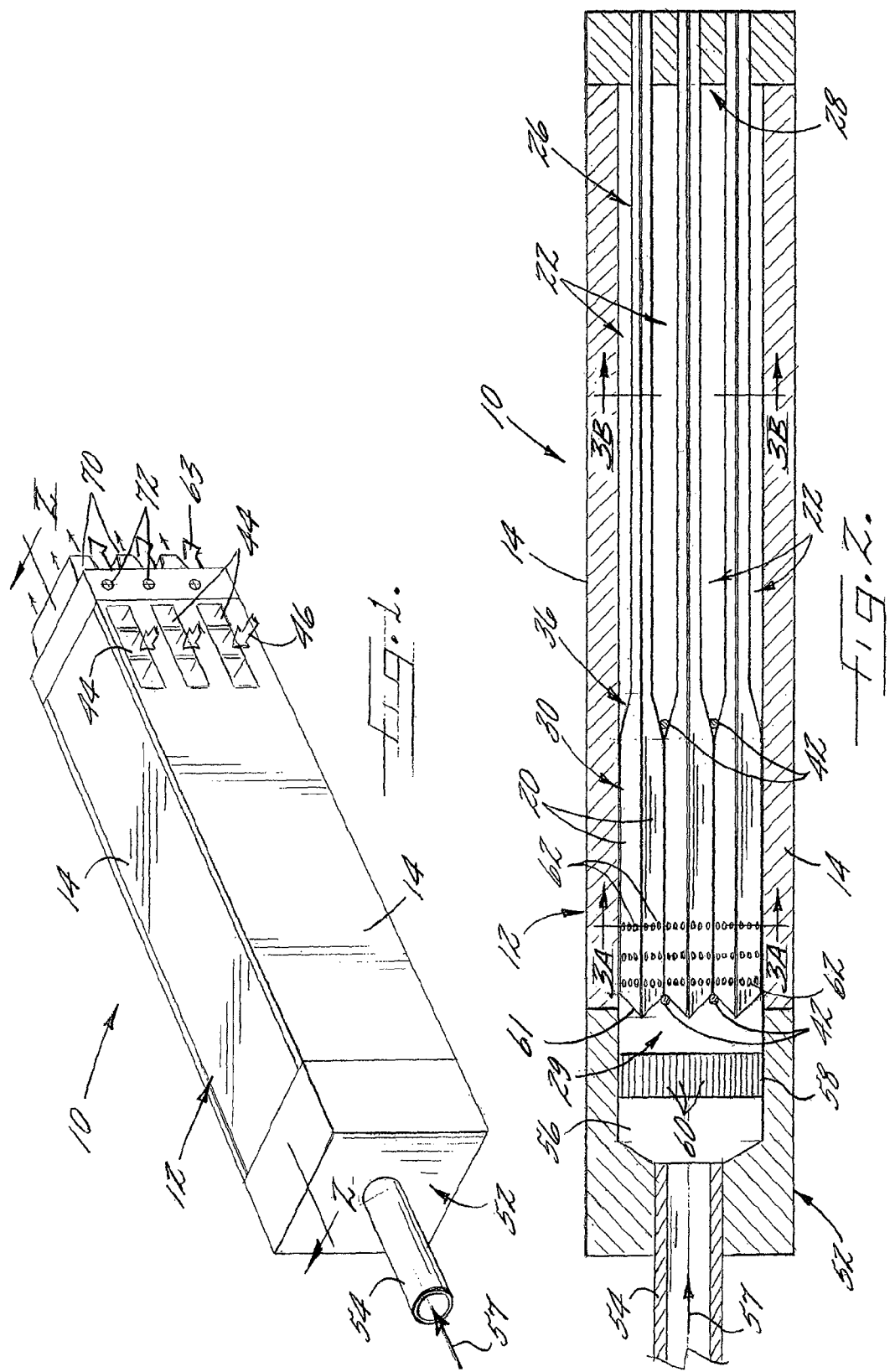

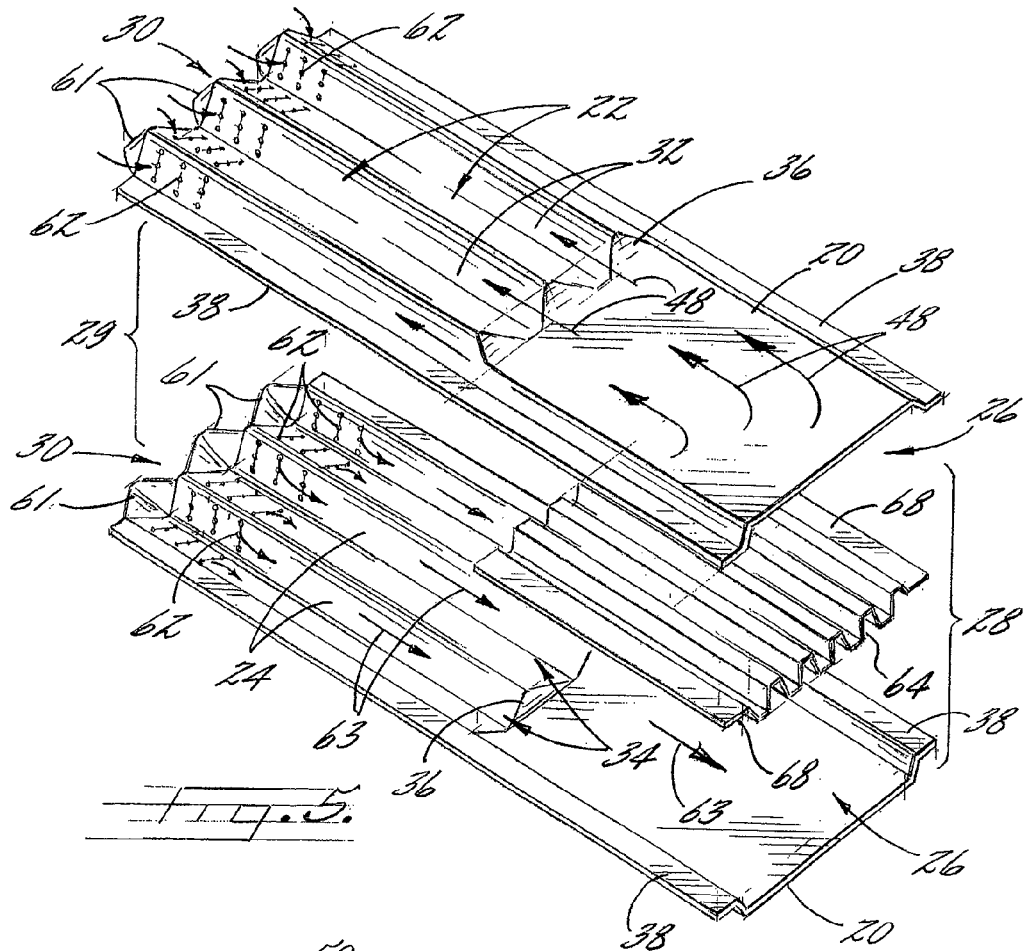
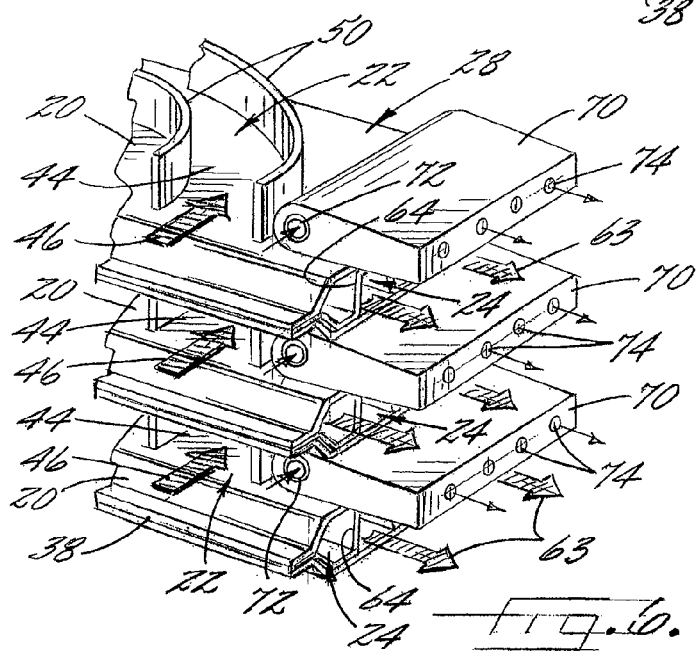

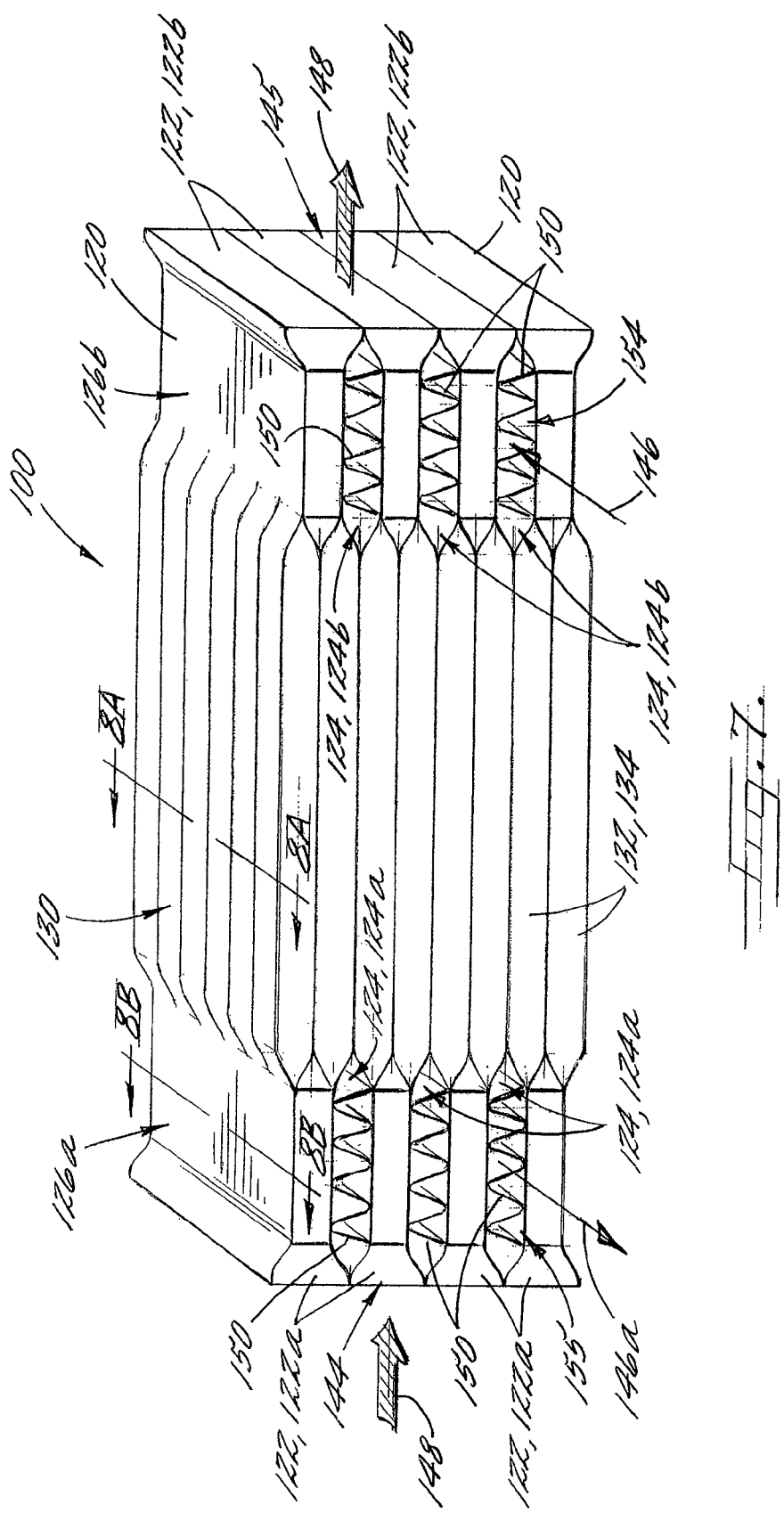

FORMED SHEET HEAT EXCHANGER

CROSS REFERENCE TO RELATED APPLICATIONS

This application is a divisional of U.S. patent application Ser. No. 10/790,377, filed Mar. 1, 2004, now abandoned which is hereby incorporated herein in its entirety by reference

BACKGROUND OF THE INVENTION

1) Field of the Invention

The present invention relates to apparatuses and methods for exchanging heat between fluids and, more particularly, to a counter-flow heat exchanger with passages defined by nonplanar sheets.

2) Description of Related Art

Heat exchangers, which are used in numerous applications and industries, generally define two sets of passages that are at least substantially fluidly disconnected. A relatively hot fluid flows through a first set of passages of the heat exchanger, and a relatively cool fluid flows through a second set of passages of the exchanger. The two sets of passages thermally communicate so that thermal energy is transferred from the hot fluid to the cool fluid. The fluids can flow in the same direction, perpendicular directions, or opposite directions. Heat exchangers characterized by opposite flow of the fluids are typically referred to as counter-flow devices.

One application for which the use of heat exchangers has been proposed is gas turbines such as are used in electricity generation. Gas turbines may include catalytic combustors, which generally provide partial combustion of the fuel and air flowing into the combustor of the turbine with low formations of nitrogen oxides ($NO_x$) and carbon monoxide (CO). Acceptable catalytic combustion reaction rates are typically achieved only when operated at a temperature substantially above ambient temperatures. Preburners are sometimes used to heat the incoming airflow via partial combustion, but a preburner can reduce the efficiency of the turbine, and byproducts such as nitrogen oxides and carbon monoxide can be formed in the preburner. A heat exchanger can instead be used to transfer thermal energy derived from the catalytic combustion process to the incoming air. However, the structural configuration required for such heat exchangers is generally complex. For example, in a conventional heat exchanger for a catalytic combustor, the air enters the heat exchanger in a direction transverse to the primary flow direction of the heat exchanger. In order for the flow direction of the air to be changed in the heat exchanger, the exchanger includes many detailed parts and many internal braze joints that cannot be easily inspected. The assembly of such a heat exchanger is typically labor intensive, and the exchanger is often subjected to large thermal strains that limit the operating life of the device.

Thus, there exists a continued need for an improved heat exchanger device. The heat exchanger should be capable of efficiently transferring thermal energy between fluids, for example, as a catalytic heat exchanger that heats the air flowing into a turbine and for other heat transfer applications. Preferably, the heat exchanger should require fewer detailed or complex parts, and fewer internal joints. The heat exchanger should preferably also be characterized by reduced assembly costs and an increased operating life.

SUMMARY OF THE INVENTION

The present invention provides an apparatus for exchanging heat between fluids. The apparatus includes a plurality of flow divider sheets that are positioned in a stacked configuration to define flow passages therebetween. Each sheet is nonuniform in a longitudinal direction and, in particular, defines a corrugated portion and at least one manifold portion. The corrugated portions of each sheet correspond to the corrugated portions of the adjacent sheets in the stack so that adjacent sheets define fluid channels therebetween in the flow passages. First and second fluids can be delivered through the flow passages, e.g., in an alternating fashion, so that the first and second fluid thermally communicate. The corrugated portions of the sheets can provide relatively large common boundary areas between the fluids in adjacent passages, thereby increasing the thermal efficiency of the heat transfer therebetween. Advantageously, the flow divider sheets can provide efficient thermal communication between the two flow streams without requiring extensive internal joints or complex parts. For example, the geometrical configuration of the apparatus can provide efficient heat exchange between hot and cold fluids by minimizing the path of thermal conduction therebetween. The close proximity of the fluids can also result in a reduction in structural loads that are induced by temperature differences. Further, the elimination of certain rigid connections typically formed in conventional heat exchanging devices can reduce the thermal stress in the apparatus. In some cases, the apparatus of the present invention can be configured with many fluid passages, which can be relatively small in cross-sectional size, and yet can be made using a relatively simple and inexpensive fabrication process.

The corrugated portions of adjacent flow divider sheets can contact one another along a plurality of interfaces extending in the longitudinal direction of the sheets, thereby substantially preventing transverse flow of the fluids between adjacent channels. Further, the corrugated portions of adjacent flow divider sheets can be substantially disconnected throughout the corrugated portions of the flow passages so that the adjacent sheets are relatively adjustable during operation of the apparatus, e.g., to accommodate nonuniform expansion or contraction of the sheets. Elongate members extending transversely can be disposed between the flow divider sheets so that the elongate members support the divider sheets and maintain the flow passages between the sheets.

According to one embodiment of the present invention, the manifold portions of the flow divider sheets define inlets that are directed transverse to the longitudinal direction of the flow divider sheets. The transverse inlets are fluidly connected to the first plurality of flow passages. Vanes can be disposed in the first flow passages and structured to direct the flow of the first fluid from a generally transverse direction at the inlets to a generally longitudinal direction at the channels.

According to one aspect of the invention, the apparatus is a catalytic heat exchanger for delivering a combustible fluid to a combustion device. The longitudinal fluid channels of the heat exchanger apparatus are fluidly connected at an end opposite the manifold portions of the sheets, e.g., by apertures through the flow divider sheets. The first plurality of the flow passages define inlets configured to receive an oxidizing fluid, which is delivered in a first flow direction to the fluid channels of the first plurality of flow passages. A fuel injector proximate to an end of the corrugated portions of the flow divider sheets is configured to deliver a combustible fluid to the oxidizing fluid at the end of the fluid channels opposite the manifold portions. Thus, the oxidizing fluid and the combustible fluid mix to form a combustible mixture that flows through the fluid channels of the second plurality of the flow passages generally opposite the direction of the oxidizing fluid. A catalyst can be disposed on the surfaces of the flow divider sheets that define the second plurality of the flow passages. Further, corrugated insert sheets, which can also have a catalyst disposed thereon, can be disposed in the second plurality of the flow passages. The second flow passages define an outlet configured to deliver the combustible mixture therefrom. A fuel injector can be provided proximate to the outlet and configured to transmit the combustible mixture therethrough and deliver additional combustible fluid to the combustible mixture.

According to another embodiment of the present invention, the apparatus is a heat exchanger for exchanging heat between first and second fluids flowing therethrough. The flow divider sheets are nonuniform in the longitudinal direction to define first and second manifold portions longitudinally opposite a corrugated portion so that each flow passage includes first and second manifold portions and a plurality of fluid channels extending longitudinally therebetween. A first plurality of the flow passages are configured to receive the first fluid, and a second plurality of the flow passages are configured to receive the second fluid. Each flow passage is structured to receive the respective fluid in the fluid channels so that thermal energy is transferred between the fluids flowing between the corrugated portions of the flow divider sheets. The manifold portions of the flow divider sheets define ports for substantially separately communicating the fluids, and at least one of the ports at each manifold portion can be configured in a transverse direction. Vanes can be disposed in the flow passages and structured to direct the fluid flow between the transverse direction of the transverse port and the longitudinal direction of the fluid channels.

BRIEF DESCRIPTION OF THE DRAWINGS

Figure 3A:
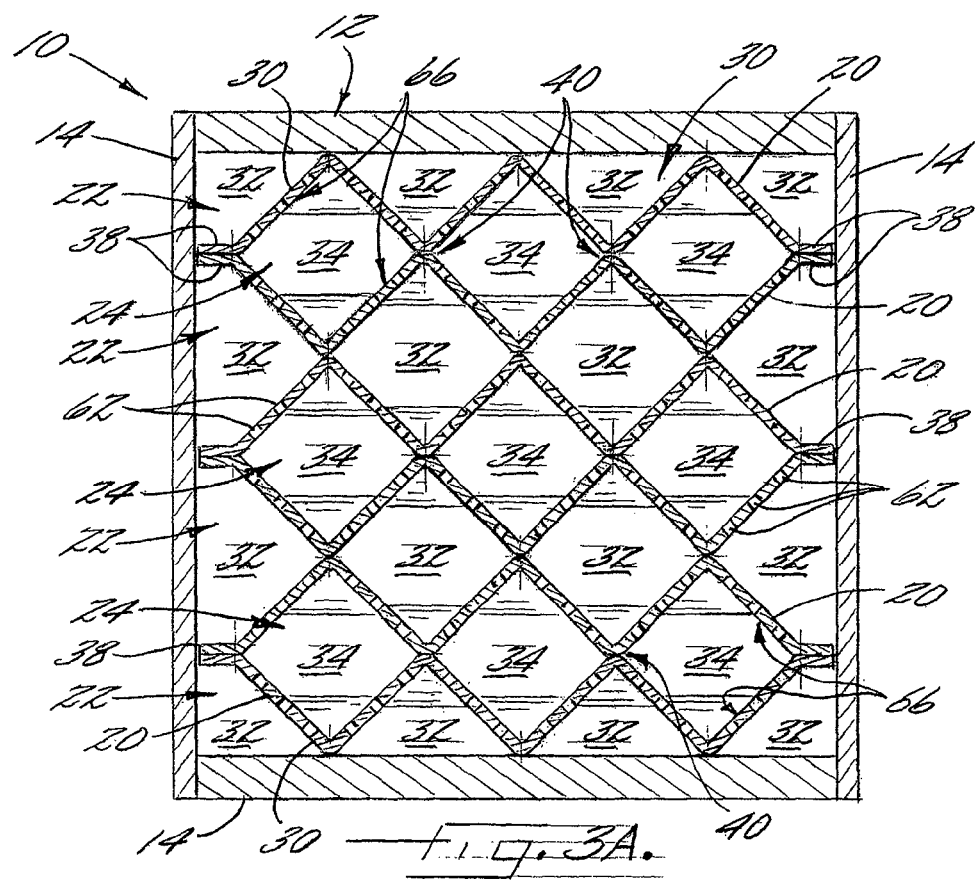
Figure 3B:
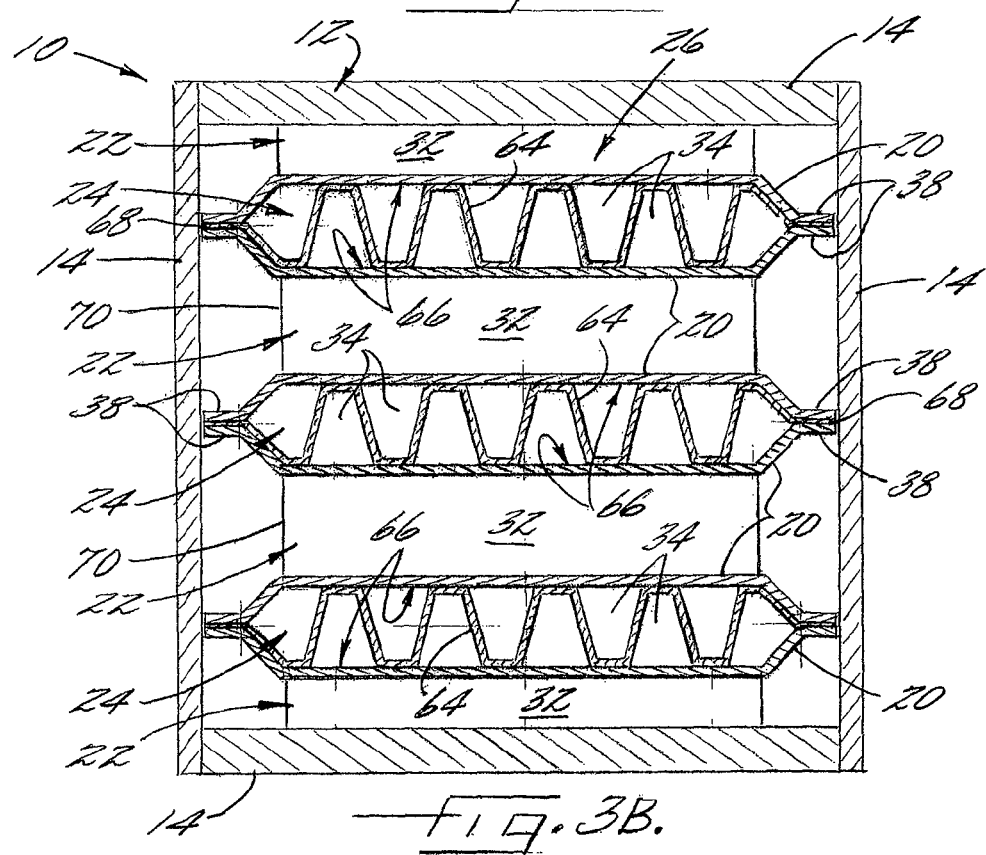
Figure 4:
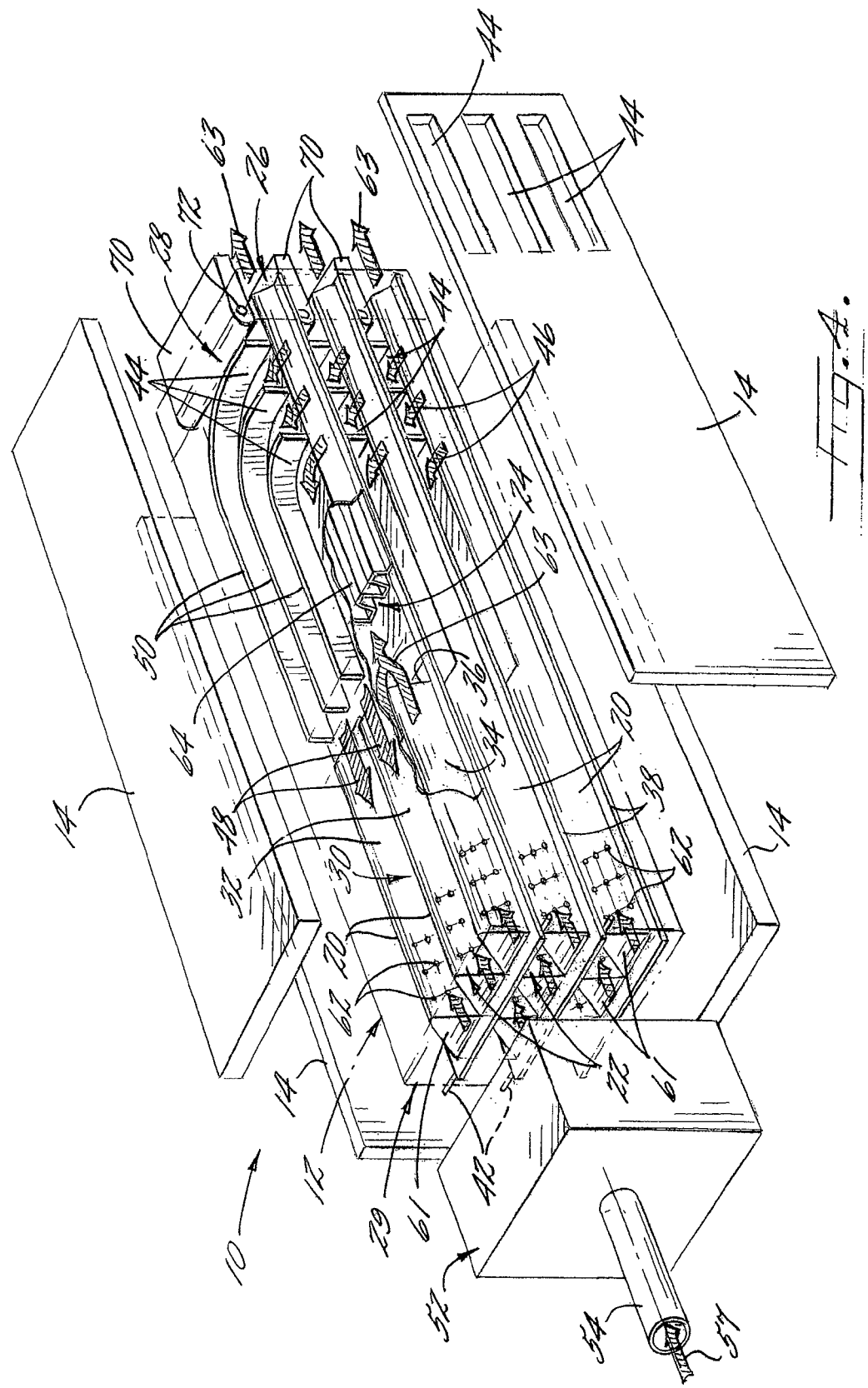
Figure 8A:
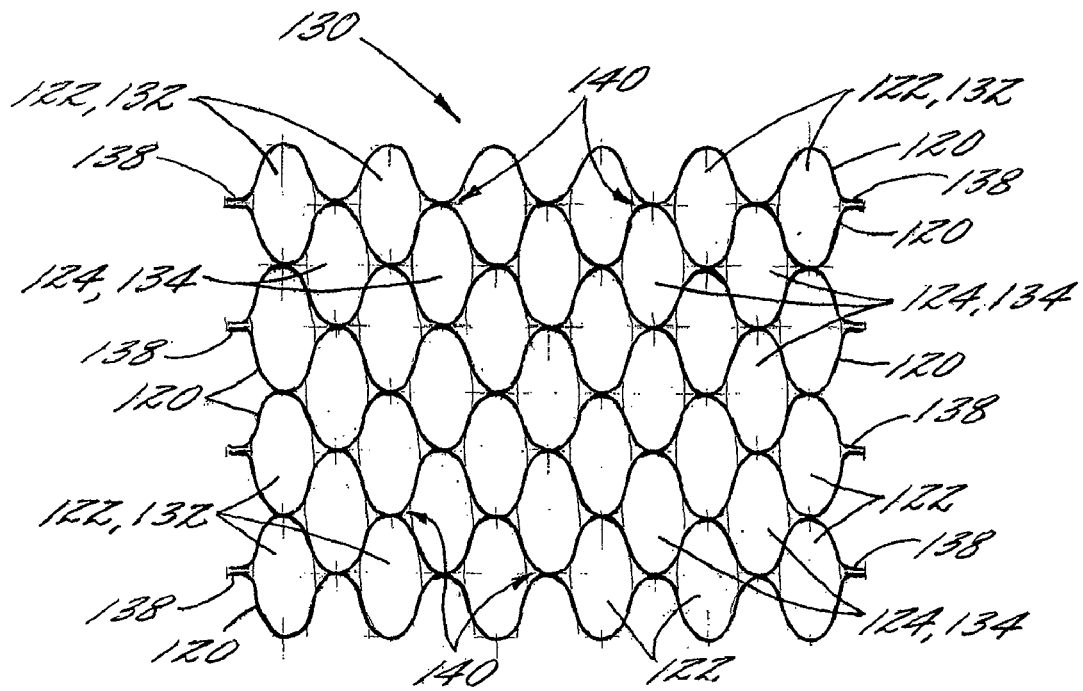
Figure 8B:
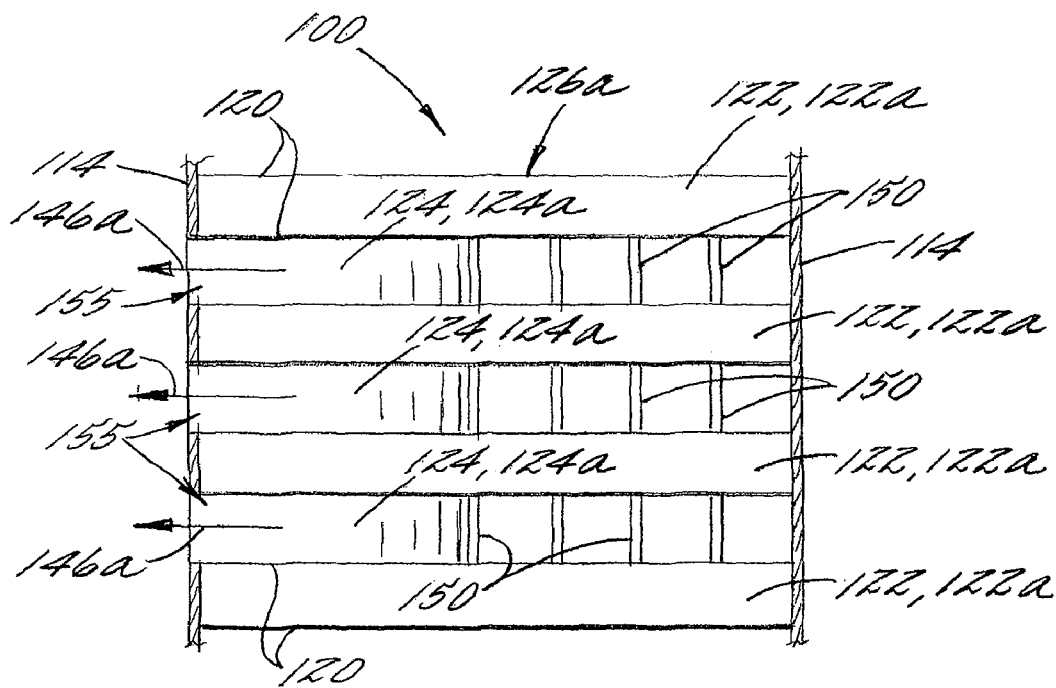

Having thus described the invention in general terms, reference will now be made to the accompanying drawings, which are not necessarily drawn to scale, and wherein:

FIG. 1 is a perspective view illustrating a catalytic heat exchanger according to one embodiment of the present invention;

FIG. 2 is a section view illustrating the catalytic heat exchanger of FIG. 1 as seen along line 2-2 of FIG. 1;

FIG. 3A is a section view illustrating the catalytic heat exchanger of FIG. 1 as seen along line 3A-3A of FIG. 2;

FIG. 3B is a section view illustrating the catalytic heat exchanger of FIG. 1 as seen along line 3B-3B of FIG. 2;

FIG. 4 is a perspective view illustrating the catalytic heat exchanger of FIG. 1 in a partially assembled configuration;

FIG. 5 is a perspective view illustrating two corrugated sheets and a corrugated insert for forming the catalytic heat exchanger of FIG. 1 shown in an exploded configuration;

FIG. 6 is a partial cut-away view in perspective view illustrating the catalytic heat exchanger of FIG. 1;

FIG. 7 is a perspective view of a heat exchanger according to another embodiment of the present invention;

FIG. 8A is a section view illustrating the heat exchanger of FIG. 7 as seen along line 8A-8A of FIG. 7; and FIG. 8B is a section view illustrating the heat exchanger of FIG. 7 as seen along line 8B-8B of FIG. 7.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, there is shown a heat exchanging apparatus 10 according to one embodiment of the present invention for transferring thermal energy between first and second fluids. In particular, the apparatus 10 shown in FIG. 1 is a catalytic heat exchanger configured to heat an oxidizing fluid, such as gaseous air, using heat derived from a combustion of a combustible mixture including a gaseous fuel, such as methane, with the air. In other embodiments of the present invention, other reactable fluids can be delivered through the apparatus 10 so that the thermal energy is derived from other types of combustion or chemical reaction. Alternatively, the fluids can enter the heat exchanger 10 with different temperatures so that no combustion is required in the apparatus 10 for generating the thermal energy.

As shown in FIGS. 1-4, the apparatus 10 includes a housing 12 defined by sidewalls 14. A plurality of flow divider sheets 20 are disposed in the housing 12 and positioned in a stacked configuration to define flow passages 22, 24 therebetween. Each of the flow divider sheets 20 extends in a longitudinal direction and is nonuniform in the longitudinal direction. In particular, each sheet 20 of the apparatus 10 defines a manifold portion 26 at one end 28 and a corrugated portion 30 at the opposite end 29. The manifold portions 26 of the sheets 20 are substantially unformed, i.e., substantially planar. The corrugated portions 30 generally are formed to define longitudinally extending contours that repeat in a transverse direction across the width of the sheets 20. For example, the corrugated portions 30 can be v-shaped, as shown in FIG. 3A, sinusoidal, or otherwise corrugated in shape. Further, the contours of adjacent pairs of the sheets 20 correspond so that each pair of the sheets 20 defines channels 32, 34 therebetween. Thus, as shown in FIG. 3B, the flow passages 22, 24 as defined by the manifold portions 26 of the flow divider sheets 20 do not generally restrict flow in a transverse direction, while the flow channels 32, 34 of the passages 22, 24 generally do provide restriction to transverse flow. Moreover, the corrugation of the sheets 20 provides an increased surface area of the sheets 20 relative to the manifold portions 26. The size and spacing of the passages 22, 24, can be an important factor in the efficiency of the apparatus 10, and the corrugated sheets 20 can provide relatively large common boundary areas between the fluids in adjacent channels 32, 34 such that a high thermal efficiency of heat transfer between the fluids can be achieved. Thus, the apparatus 10 and the passages 22, 24 thereof can be made relatively small (and possibly at reduced expense) compared to some conventional heat exchanger devices that provide similar heat transfer rates between fluids.

Each flow divider sheet 20 can be formed from a single sheet of material, e.g., from a planar sheet of steel. The sheets 20 can be formed by various forming techniques such as by stamping the sheets 20 with dies that define the desired corrugated contours, by hydroforming, electromagnetic forming, rolling, and the like. The contour of the corrugated portions 30 of the sheets 20 can be designed according to the method used for forming the sheets 20 as well as the material properties of the sheets 20, e.g., the formability of the material. For example, each sheet 20 defines a transition portion 36 between the manifold and corrugated portions 26, 30. Typically the transition portion 36 is at least about twice the height of the corrugations, e.g., at least about as thick as the total height of the corrugated portion of the sheet 20, which has corrugations extending in opposite directions from a plane defined by the manifold portion 26.

As indicated in FIG. 3A, the channels 32, 34 are configured to receive different fluids. In particular, a first group 32 of the channels is configured to receive air and a second group 34 of the channels is configured to receive a combustible mixture. The first channels 32 are part of a first group 22 of the flow passages, and the second channels 34 are part of a second group 24 of the flow passages. The sheets 20 can be joined in pairs so that each pair of sheets 20 defines a row of the second channels 34 therebetween. The sheets 20 can be joined at the transverse edges 38, e.g., by welding or otherwise connecting the transverse edges 38. The corrugated portions 30 of the sheets 20 can define interfaces 40 between the adjacent channels 32, 34 of each row. The interfaces 40 can substantially separate the adjacent channels 32, 34, but the interfaces 40 can be unjoined, i.e., not welded or otherwise rigidly connected, thus providing flexibility to the arrangement of the sheets 20 so that each sheet 20 can adjust to some extent relative to the other sheets 20, e.g., if the sheets 20 expand or contract differently as a result of thermal changes.

The width of the flow divider sheets 20 and the height of the stack of sheets 20 can correspond to the inner dimensions of the sidewalls 14 of the housing 12 so that the sheets 20 are constrained from moving transversely in the housing 12. Further, the transverse edges 38 of the flow divider sheets 20 can be generally free to slide against the sidewalls 14 so that the sidewalls 14 do not constrain longitudinal adjustment of the flow divider sheets 20. Thus, one longitudinal end 28 of each flow divider sheet 20 can be substantially rigidly constrained and the longitudinally opposite end 29 can be adjustable relative thereto so that the sheets 20 can expand or contract, e.g., as the sheets 20 are heated and cooled. Further, as shown in FIGS. 2 and 4, elongate members 42 can be disposed between adjacent pairs of the flow divider sheets 20 to maintain the position of the sheets 20 and the channels 32, 34 therebetween. For example, the elongate members 42 can be wires extended in a transverse direction to prevent the sheets 20 from "nesting" or otherwise collapsing.

The air is provided to the first flow passages 22 through inlets 44 extending in a transverse direction 46 so that the air flows transversely between the manifold portions 26 of the corrugated sheets 20 at the first end 28 of the sheets 20 to the first channels 32. The air then flows in a longitudinal direction 48 through the first channels 32 toward the second end 29 of the sheets 20. As illustrated, the inlets 44 are provided on a single transverse side of the apparatus 10, but the inlets 44 can alternatively be located on multiple sides, e.g., on transversely opposite sides of the housing 12. In either case, vanes 50 can be provided between the manifold portions 26 of the flow divider sheets 20 in the first flow passages 22 to direct the flow of the oxidizing fluid therethrough. For example, the vanes 50 can define curved passages extending transversely inward from the inlets 44 and curving to direct the oxidizing fluid to the longitudinal direction 48 and into the first channels 32. Each of the vanes 50 can be provided as a separate structure, or the vanes 50 can be formed as a single corrugated sheet of material, with the corrugations extending in a curved configuration to direct the flow of the fluids as desired through the apparatus 10. In either case, the vanes 50 can provide structural support to the manifold portions 26 of the sheets 20.

A fuel injector 52 is positioned at the second end 29 of the channels 20 and configured to provide a combustible fluid to be mixed with the air. In particular, the fuel injector 52 of the illustrated embodiment includes a fuel inlet 54, which is connected to an injector reservoir 56 (FIG. 2). The inlet 54 can be connected to a source of combustible fluid, such as a vessel for providing pressurized gaseous methane, liquid jet fuel, or other combustible fluids. The combustible fluid flows through the fuel inlet 54 to the reservoir 56 in direction 57 and exits the reservoir 56 through a fuel injection plate 58, i.e., a plate with a plurality of apertures 60 extending therethrough. Thus, the combustible fluid flows from the reservoir 56 through the apertures 60 of the injection plate 58 and enters the first channels 32 at the second end 29. In the first channels 32, the combustible fluid mixes with the oxidizing fluid therein to form a gaseous combustible mixture.

The second ends 29 of the second channels 34 defined by the sheets 20 are closed as indicated at 61 in FIGS. 4 and 5, but a plurality of apertures 62 proximate to the second ends 29 are provided in the sheets 20 such that the combustible mixture flows from the first channels 32 into the second channels 34. The combustible mixture generally flows in the second channels 34 in a longitudinal direction 63 opposite to the direction 48 of the air flowing in the first channels 32. The combustible mixture is combusted in the second fluid channels 34, i.e., the combustible fluid and the oxidizing fluid react exothermically, without necessarily completely combusting the combustible fluid. Heat derived from the reaction in the second channels 34 is exchanged, i.e., thermally communicated, through the flow divider sheets 20 and heats the oxidizing fluid in the first channels 32. Thus, the oxidizing fluid can be heated before being combusted. Advantageously, the oxidizing fluid can be heated to a temperature to sustain the catalytic combustion process, reducing the formation of nitrogen oxides ($NO_x$). It will be appreciated that the amount of the oxidizing fluid combusted and the resulting temperature can be controlled by adjusting the types of combustible and oxidizing fluids, the flow rates and pressures of the fluids, and the like.

Corrugated inserts 64 can be disposed in the second flow passages 24 between the manifold portions 26 of the flow divider sheets 20. The corrugated inserts 64 define parallel passages extending in the longitudinal direction so that the combustible fluid is directed by the inserts 64 from the second channels 34 to the first end 28 of the flow divider sheets 20. For example, FIG. 5 illustrates a pair of the flow divider sheets 20 and one of the corrugated inserts 64 in an unassembled configuration. The corrugated inserts 64 are about as long in the longitudinal direction as the manifold portions 26 of the flow divider sheets 20 so that the corrugated inserts 64 guide the flow of the fluid through the length of the flow passages 24 between the manifold portions 26. The surfaces of the flow divider sheets 20 that are directed toward the second flow passages 24 can be coated with a catalyst 66 for promoting the combustion of the combustible fluid in the second flow passages 24. Further, the corrugated inserts 64 can also be coated with the catalyst 66, thereby increasing the catalyzed surface area provided in communication with the combustible fluid flowing through the second passages 24. For example, the catalyst 66 can be a platinum-based material with one or more precursors, as is known in the art.

Transverse edges 68 of the corrugated inserts 64, shown in FIG. 5, can be joined to the transverse edges 38 of the flow divider sheets 20. However, the corrugated inserts 64 can be substantially unjoined to the manifold portions 26 of the flow divider sheets 20 between the transverse edges 38, thereby minimizing the number of joints required during manufacture of the apparatus 10 and providing some flexibility between the inserts 64 and the flow divider sheets 20 to allow relative movement therebetween during expansions or contraction, e.g., during heating and cooling. According to one embodiment of the present invention, the flow divider sheets 20 can define channels, slots, or other contours (not shown) that extend longitudinally along the manifold portions, each contour being configured to receive a portion of the adjacent corrugated insert 64, thereby restraining a transverse movement of the corrugated inserts 64 relative the adjacent flow divider sheets 20.

At the first end 28 of the flow divider sheets 20, the flow divider sheets 20 can be connected to a combustion device such as a turbine and the second flow passages 34 can be fluidly connected to the combustion device. Thus, the combustion device can be configured to receive the combustible fluid and further combust the fluid. As shown in FIG. 6, main injectors 70 can be provided at the first end 28 of the flow divider sheets 20. The main injectors 70 can be disposed between the flow divider sheets 20 in the first flow passages 22. The main injectors 70 are structured to receive a combustible fluid, which can be the same combustible fluid provided to the fuel injector 52. For example, the combustible fluid can enter an inlet 72 of each main injector 70 and flow therethrough to a plurality of nozzles 74 configured to inject the combustible fluid to be mixed with the combustible mixture flowing out the first end 28 of the flow divider sheets 20. Thus, the main injectors 70 can increase the content of the combustible fluid in the mixture, thereby increasing combustion of the mixture that occurs in the turbine or other combustion device.

According to one method of operation, air is received through the inlet 44 and into the first flow passages 22. The air enters the apparatus 10 at a first temperature, such as about 600° F. In the first flow passages 22, and in particular in the first flow channels 32 thereof, the air receives thermal energy from the combustible mixture in the second flow passages 24, e.g., from the channels 34, and is heated to an elevated temperature, such as about 900° F. Gaseous methane, or another fuel, is injected by the injector 52 and mixes with the air. The methane and air flow through the apertures 62 in the flow divider sheets 20 to form the combustible mixture in the second flow passage 24. The combustible mixture flows longitudinally in the direction 63 opposite the direction 48 of flow of the air in the first flow passages 22. The combustible mixture is at least partially combusted in the second flow passages 24, thereby releasing thermal energy that is delivered through the flow divider sheets 20 to the air in the adjacent first flow passages 22. The combustible mixture exits the channels 34 of the second flow passages 24 at a temperature, e.g., about 1550° F., and flows through the passages 24 between the manifold portions 26 of the flow divider sheets 20, passing through longitudinal channels defined by the corrugated inserts 64, where the catalytic combustion process continues. The hot combustible mixture then flows through the main injectors 70 toward a gas turbine, and the main injectors 70 provide additional fuel so that the combustible fluid can be further combusted prior to entering the turbine, e.g., to a temperature of about 2600° F. It will be appreciated that the particular flow configuration and the temperatures of the fluids are exemplary and other flow configurations and temperatures are possible.

The apparatus 10 described above in connection with FIGS. 1-6 is configured to reverse the flow of a fluid so that the fluid can be fed to a combustion process that preheats the same fluid. However, in other embodiments of the present invention, the apparatus can be used for exchanging heat between other fluids, such as between relatively hot and cold fluids, which need not be combusted or mixed in the apparatus. For example, FIG. 7 illustrates an apparatus 100 according to another embodiment of the present invention configured to receive first and second fluids and transfer thermal energy therebetween. The heat exchanger apparatus 100 includes a plurality of flow divider sheets 120 that are positioned in a stacked configuration. Each sheet 120 extends in a longitudinal direction and is nonuniform in the longitudinal direction. More particularly, each sheet 120 defines a corrugated portion 130 disposed longitudinally between first and second manifold portions 126a, 126b, which are relatively planar. The sheets 120 are stacked so each adjacent pair of the sheets 120 defines a flow passage 122, 124 therebetween. The adjacent sheets 120 are configured so that the corrugated portions 130 define longitudinal interfaces 140 that substantially transversely separate longitudinal channels 132, 134, similar to the channels 32, 34 described above in connection with FIGS. 3A and 3B. Thus, each flow passage 122, 124 includes a first manifold flow passage 122a, 124a defined by the first manifold portions 126a of the sheets 120, a second manifold passage 122b, 124b defined by the second manifold portion 126b of the sheets 120, and a plurality of the flow channels 132, 134 fluidly connecting the first and second manifold passages 122a, 124a, 122b, 124b.

In the embodiment illustrated in FIG. 7, the flow passages 122, 124 are designated as first flow passages 122 and second flow passages 124, which are configured in an alternating configuration. That is, each of the first flow passages 122 is disposed between adjacent second flow passages 124. The first flow passages 122 are configured to receive a first fluid, and the second flow passages 124 are configured to receive a second fluid. Thus, the first and second fluids thermally communicate in the apparatus 100 and, in particular, the warmer fluid heats the cooler fluid by conduction through the flow divider sheets 120, which separate the adjacent flow passages 122, 124. Advantageously, the contoured cross-sectional shape of the corrugated portions 130 of the sheets 120 provides an increased area of thermal communication between the adjacent flow passages 122, 124 as compared to the surface area provided between planar sheets of similar dimensions. The increased area can increase the heat transfer between the two fluids.

Each of the first flow passages 122 defines inlet and outlet ports 144, 145 disposed in the longitudinal direction, and the second flow passages define inlet and outlet ports 154, 155 disposed transversely. More particularly, the first and second manifold passages 122a, 122b fluidly connect the first fluid channels 132 to the longitudinal inlet and outlet ports 144, 145. Thus, fluid received by the inlet port 144 flows in a longitudinal direction 148 through the first manifold passages 122a, through the corresponding first fluid channels 132, and then through the second manifold passages 122b to the outlet 145. The first and second manifold passages 124a, 124b fluidly connect the second fluid channels 134 to the transverse inlet and outlet ports 154, 155. Thus, fluid received by the transverse inlet port 154 flows through the second manifold passages 124b, through the corresponding second fluid channels 134, and then through the first manifold passages 124a to the transverse outlet 155. Vanes or other flow guide devices 150 can be provided between the manifold portions 124 of the flow divider sheets 120 to direct the fluid(s) between the ports 144, 145, 154, 155 and the fluid channels 132, 134. For example, the vanes 150 can be disposed between each of the manifold passages 124a, 124b and curved to direct the flow of the second fluid from a transverse direction 146 at the inlet port 154 to longitudinal direction at the fluid channels 134 and, at the opposite end of the apparatus 100, from the longitudinal direction of the fluid channels 134 to an opposite transverse direction 146a at the outlet port 155. The vanes 150 can be configured to direct the first fluid between multiple inlets and/or outlets, e.g., a pair of inlets on transversely opposite sides of the apparatus 100 and a pair of outlets also on the transversely opposite sides of the apparatus. Other guide devices can be formed of corrugated sheets or other channeled devices that direct the fluid in the transverse direction. Vanes or other guide devices can also be provided in the first flow passages 122. The vanes 150 or other guide devices can provide structural support to the manifold portions 126a, 126b of the flow divider sheets 120 by maintaining a desired gap between adjacent sheets 120. Alternatively or additionally, the flow divider sheets 120 can be supported by a plurality of elongate members (not shown) disposed between the flow divider sheets 120 and extending in a generally transverse direction, similar to the elongate members 42 described above in connection with FIG. 2.

The flow divider sheets 120 are joined in pairs, each pair of sheets 120 defining one of the second flow passages 124 therebetween. For example, each pair of sheets 120 can be joined along transverse edges 138 thereof by side members 114. The first flow passages 122 are defined between the adjacent pairs of sheets 120. A housing formed of side members or other structures can be also be provided to at least partially seal the second flow passages 124 along the transverse sides 138 of the corrugated portions 130 of the sheets 120 and at the longitudinal ends of the sheets 120. The corrugated portions 130 of the sheets 120 can be otherwise disconnected so that the adjacent sheets 120 are relatively adjustable during operation of the apparatus 100, e.g., to accommodate nonuniform expansion and contraction of the sheets 120 during heating and cooling.

The inlets 144, 154 of the first and second flow passages 122, 124 are at opposite ends of the apparatus 100 so that the two fluids flow generally longitudinally in opposite directions, i.e., a counterflow configuration. In other embodiments of the invention, however, the two fluids can flow in the same direction through the apparatus 100 if desired.

Many modifications and other embodiments of the invention will come to mind to one skilled in the art to which this invention pertains having the benefit of the teachings presented in the foregoing descriptions and the associated drawings. For example, it is understood that the fabrication processes for producing the components of the described apparatuses are highly scaleable, that is, the components and, hence, the apparatuses can be formed at any size according to the needs of any particular application. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A catalytic heat exchanger apparatus for delivering a combustible fluid to a combustion device, the apparatus comprising:
   a plurality of flow divider sheets extending in a longitudinal direction and positioned in a stacked configuration such that adjacent pairs of the sheets define flow passages therebetween, each sheet being nonuniform in the longitudinal direction to define a manifold portion and a corrugated portion, the manifold portions of the adjacent pairs of the sheets defining the flow passages therebetween for receiving the fluid, the corrugated portions of each adjacent pair of sheets defining a plurality of fluid channels therebetween and connected to the flow passages defined by the manifold portions of a respective pair of the flow divider sheets, the fluid channels extending generally in the longitudinal direction and being fluidly connected at an end opposite the manifold portions of the sheets, wherein an adjacent pair of sheets defines in the manifold portion a cavity extending between opposed transverse edges of the adjacent pair of sheets and in the corrugated portion the plurality of longitudinally extending flow passages that open into the cavity;
   a corrugated insert disposed within the cavity and defining a plurality of flow passages in fluid communication with the flow passages of the corrugated portion;
   a plurality of inlets defined by a first plurality of the flow passages, the inlets configured to receive an oxidizing fluid and deliver the oxidizing fluid in a first flow direction to the fluid channels of the first plurality of flow passages;
   a fuel injector proximate to an end of the corrugated portions of the flow divider sheets, the fuel injector configured to deliver a combustible fluid to the oxidizing fluid at the end of the fluid channels opposite the manifold portions such that the oxidizing fluid and the combustible fluid mix to form a combustible mixture flowing through the fluid channels of a second plurality of the flow passages in a second flow direction generally opposite the first flow direction; and
   an outlet defined by the second plurality of the flow passages, the outlet configured to deliver the combustible mixture from the second plurality of the flow passages,
   wherein the first and second pluralities of flow passages thermally communicate such that thermal energy resulting from a combustion of the combustible fluid in the fluid channels of the second plurality of the flow passages is transferred to the oxidizing fluid in the fluid channels of the first plurality of the flow passages, thereby pre-heating the oxidizing fluid before the oxidizing fluid enters the second plurality of the flow passages.

2. An apparatus according to claim 1 wherein the inlets are configured in a direction transverse to the longitudinal direction of the flow divider sheets such that the oxidizing fluid enters the first flow passages in the transverse direction and is directed to the longitudinal direction of the fluid channels of the first flow passages.

3. An apparatus according to claim 2 further comprising vanes disposed in the first flow passages and structured to direct the flow of the oxidizing fluid from a generally transverse direction at the inlets to a generally longitudinal direction at the channels.

4. An apparatus according to claim 1 wherein the corrugated portions of adjacent flow divider sheets contact along a plurality of interfaces extending in the longitudinal direction of the sheets, thereby substantially preventing transverse flow of the fluids in the channels between adjacent channels.

5. An apparatus according to claim 1 wherein the corrugated portions of adjacent flow divider sheets are substantially disconnected throughout the corrugated portions of the flow passages and between the opposed transverse edges of the adjacent pair of sheets such that the adjacent sheets are adjustable during operation of the apparatus.

6. An apparatus according to claim 1 further comprising a plurality of elongate members disposed between the flow divider sheets and extending in a generally transverse direction, the elongate members structured to maintain a position of the flow divider sheets and thereby maintain the flow passages therebetween.

7. An apparatus according to claim 1 wherein at least some of the flow divider sheets define apertures fluidly connecting the fluid channels of the first and second flow passages.

8. An apparatus according to claim 1 further comprising a second fuel injector proximate to the outlet of the second plurality of the flow passages, the second fuel injector configured to transmit the combustible mixture therethrough and deliver additional combustible fluid to the combustible mixture.

9. An apparatus according to claim 1 further comprising a catalyst disposed on surfaces of the flow divider sheets defining the second plurality of the flow passages.

10. An apparatus according to claim 1 wherein the corrugated insert has a catalyst disposed on at least one surface thereof.

11. An apparatus according to claim 1 wherein the plurality of flow passages defined by the corrugated insert are differently shaped or sized than the plurality of flow passages in the corrugated portion.

12. An apparatus according to claim 1 wherein the plurality of flow passages defined by the corrugated insert are spaced in the longitudinal direction from the plurality of flow passages in the corrugated portion.

13. An apparatus according to claim 1 wherein the corrugated insert is joined to the adjacent pair of sheets along the opposed transverse edges and is substantially unjoined from the adjacent pair of sheets within the cavity between the opposed transverse edges.

14. An apparatus according to claim 1 wherein a flow divider sheet at least partially defines both the first plurality of flow passages and the second plurality of flow passages with one surface of the flow divider sheet configured to be in contact with the oxidizing fluid in the fluid channels of the first plurality of flow passages and an opposite surface of the flow divider sheet configured to be in contact with the combustible mixture in the fluid channels of the second plurality of flow passages.

* * * * *